United States Patent [19]

Dinger

[11] Patent Number: 4,498,344
[45] Date of Patent: Feb. 12, 1985

[54] SENSITIVE ELEMENT FOR USE IN A STRAIN SENSOR AND A SENSOR COMPRISING SUCH AN ELEMENT

[75] Inventor: Rudolf Dinger, St. Aubin, Switzerland

[73] Assignee: Asulab S.A., Bienne, Switzerland

[21] Appl. No.: 509,673

[22] Filed: Jun. 30, 1983

[30] Foreign Application Priority Data

Jul. 1, 1982 [FR] France ................................ 82 11717

[51] Int. Cl.³ ............................................. G01L 1/10
[52] U.S. Cl. .................................... 73/778; 73/862.59; 73/766; 73/702
[58] Field of Search ............. 73/778, 862.59, DIG. 1, 73/DIG. 4, 702, 703, 704, 721, 727, 517 AV, 766

[56] References Cited

U.S. PATENT DOCUMENTS 4,215,570 8/1980 Eernisse ........................... 73/862.59
4,372,173 2/1983 Eernisse ................................ 73/778

Primary Examiner—Anthony V. Ciarlante
Attorney, Agent, or Firm—Pollock, Vande Sande & Priddy

[57] ABSTRACT

A sensitive element is described for use with a strain sensor, which has low sensitivity to temperature.

The sensitive element comprises a support, preferably consisting of a thin plate, on which is secured a piezoelectric resonator preferably shaped as a double tuning-fork. The deformations of the support are transmitted to the resonator thereby modifying the frequency of resonance.

10 Claims, 10 Drawing Figures

SENSITIVE ELEMENT FOR USE IN A STRAIN SENSOR AND A SENSOR COMPRISING SUCH AN ELEMENT

BACKGROUND OF THE INVENTION

1. Field of the Invention

This invention relates to a sensitive element for use in a strain sensor and to a pressure sensor using such an element.

By strain sensor is meant a device capable of measuring a force to which it is subjected or a device capable of measuring a mechanical strain or a pressure.

2. Prior Art

For measuring atmospheric pressure and pressure changes by means of portable apparatus, such as an altimeter, several phenomena may be made use of. Generally, an evacuated capsule having parallel walls consisting of highly elastic diaphragms is used as a detector or sensitive element. In an altimeter of the usual kind, the deformation or bending to which the bottom of the capsule is subjected by the outer pressure is amplified and mechanically converted into a rotary motion of a needle via a gear-train.

Further, piezoresistive sensors are at present found on the market that consist of a silicon crystal diaphragm in which resistances are formed by diffusion. When a pressure difference exists between the two surfaces of the diaphragm, the resulting deformation causes the resistance to vary. Generally, four resistances are made at the same time so as to produce a temperature-compensated measuring circuit in the form of a bridge, with all resistances having the same temperature coefficient.

All of these detectors are relatively costly since they require very careful individual adjustment. Also, the measured physical magnitude is converted into another magnitude which is analogical: angular movement or change in resistance. In a recent publication (IEEE Transactions on Industrial Electronics and Control Instrumentation, Volume IECI 25, Number 1, February 1978, pages 29 to 38), a proposal was made to design pressure-measuring capsules with a resonant structure. The sensitive diaphragm forms a vibrating membrane and use is made of the resonant frequency of the capsule which is coupled to an electronic oscillator, said frequency varying with the outside pressure applied to the capsule. However, the construction of such a resonant capsule is very tricky and is not suited to economic production on a very large scale.

It is also known from European published specification No. 50307 to produce a force sensor from a quartz resonator. Such a sensor could in principle also measure pressures. But such a sensor fails to solve the problem caused by temperature changes.

SUMMARY OF THE INVENTION

A first object of the invention is to provide a sensitive element for a strain sensor that is able both to obtain information in virtually digital form and to eliminate temperature effects, while at the same time exhibiting good sensitivity.

The sensitive element provided by the invention comprises:
a support having a coefficient of thermal expansion $\alpha$;
an elongated piezoelectric resonator provided with electrodes; and
means for securing the resonator to the support for transmitting to the resonator and lengthwise thereof strains applied to the support, the resonator having a cut such that its coefficient of thermal expansion longitudinally thereof is substantially equal to $\alpha$.

When a pressure is to be measured, the support is a plate that is subjected to such pressure. The resulting strain is transmitted to the resonator. Under the action of this strain, the resonant frequency of the resonator varies most appreciably in dependence on the strain to which it is subjected. Also, by suitably selecting the cut of the resonator, the effect of temperature on the resonant frequency can be reduced to a very substantial extent thereby avoiding having to provide a special construction to compensate for temperature.

Preferably the resonator has a so-called "double tuning-fork" structure that operates in the flexion mode. This concept will be explained further on.

According to a still preferred form of embodiment of the sensitive element the resonator is made of quartz and the plate, which is of metal, has a thermal coefficient of expansion ranging from 7.5 to $13.7 \times 10^{-6}/°C$. (parts per million per degree Celsius).

A second object of the invention is to provide a pressure sensor which uses the sensitive element and which is able to measure pressure with a high resolution and without any appreciable adverse temperature effects.

This pressure sensor comprises:
a casing;
a sensitive element as set forth above in which the support is a thin plate which is secured in fluidtight manner to the casing so as to divide the casing into first and second chambers;
means for applying the pressure to be measured in the first chamber; and
means for applying voltages to the electrode of the sensitive element and for receiving an electric signal having a frequency which is dependent on said pressure.

BRIEF DESCRIPTION OF THE DRAWINGS

In the accompanying drawings given by way of example.

DETAILED DESCRIPTION

Figure 1:
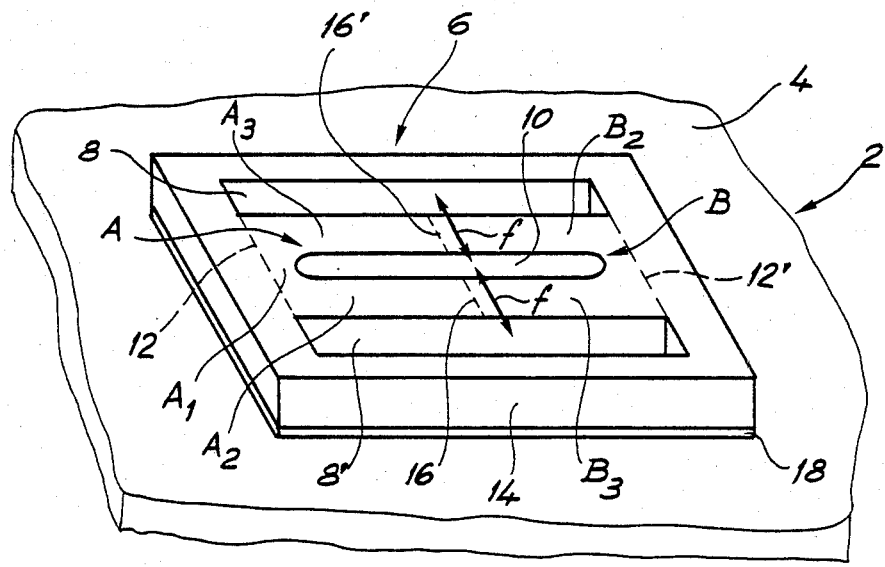
FIG. 1 is a simplified perspective view of a first form of embodiment of the sensitive element according to the invention.

The sensitive element 2 shown in FIG. 1 comprises a support consisting here of a thin plate 4 to which is secured a piezoelectric resonator 6 of the "double tuning-fork" kind, i.e. the resonator has a substantially rectangular outer contour and is formed with two longitudinal outer slots 8 and 8' and with a shorter central slot 10. The slots 8 and 8', along with broken lines 12 and 12', demarcate a central region in relation to a rectangular peripheral frame 14. The central region constitutes the resonator proper which is the equivalent of two tuning-forks A and B with the free ends of their arms paired off. As will readily be observed in the central region, the slot 10, the broken lines 12 and 12', and the broken lines 16 and 16' do in effect define the outline of two tuning-forks. For instance, the tuning-fork A has a base $A_1$ that is integral with frame 14, and arms $A_2$ and $A_3$. Similarly, the tuning-fork B has a base $B_1$ and arms $B_2$ and $B_3$. The free ends of arms $A_2$ and $B_3$ are joined together as are the free ends of arms $A_3$ and $B_2$. A layer 18 of adhesive or solder secures the resonator 6 to the plate 4 via the frame 14. Thus, the strains or deformations to which the plate 4 is subjected are fully transmitted to the resonator 6. The resonator, consisting of the double tuning-fork, is energized to vibrate in a fundamental mode of flexion as symbolised by the arrows f.

The resonator 6 may for instance have a thickness of 125 μm, an overall length of 5 mm and an overall width of 1.3 mm. The overall width of the tuning-forks, i.e. the distance between the slots 8 and 8', is about 430 μm, the width of each arm is about 155 μm and the overall length L of the arms of the double tuning-fork, i.e. the length of the central slot 10, is 3.4 mm.

Figure 2:
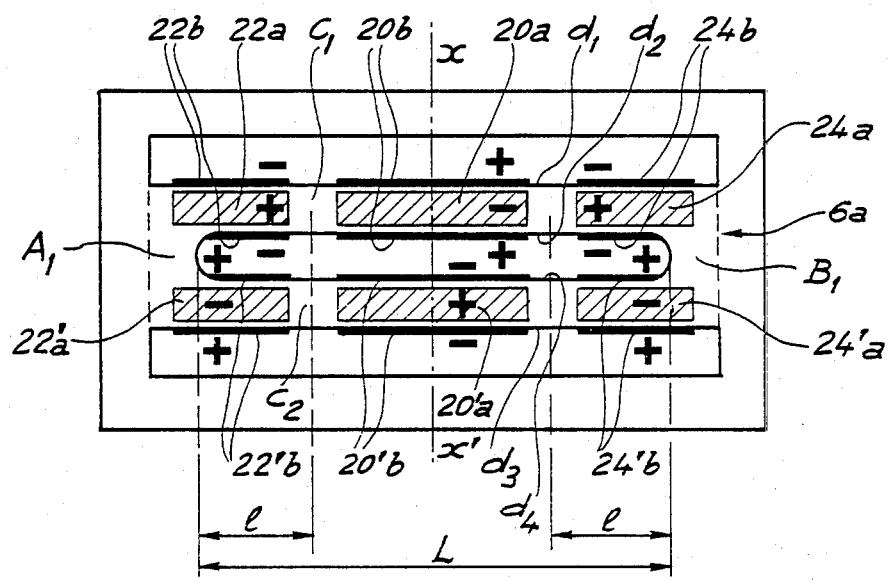
FIG. 2 is a plan view of a resonator used in the sensitive element shown in FIG. 1.

FIG. 2 shows a plurality of electrodes arranged to excite the double tuning-fork in the flexion mode. To help the description of these electrodes, the bar formed by the arms $A_3$ and $B_2$ of the tuning-forks is referenced $C_1$ and the bar formed by the arms $A_2$ and $B_3$ of the tuning forks is referenced $C_2$. Further, x—x' is a line coplanar with the broken lines 16 and 16' and thus forms the dividing line between the two tuning-forks. 6a designates the top surface of the resonator (its bottom surface is not visible in FIG. 2). The sides of the bars $C_1$ and $C_2$ that are perpendicular to the plane of FIG. 2 and hence to the upper surface 6a of the resonator are termed flanks, with the outer and inner flanks of bar $C_1$ being respectively referenced $d_1$ and $d_2$ and with the outer and inner flanks of bar $C_2$ being respectively referenced $d_3$ and $d_4$. The bars $C_1$ and $C_2$ bear on their top surfaces central electrodes 20a and 20'a, that straddle the line x—x' symmetrically, and terminal electrodes 22a, 22'a, 24a and 24'a that overlap onto the bases $A_1$ and $A_2$. The bottom surfaces of the bars $C_1$ and $C_2$ are provided with an identical and coinciding arrangement of electrodes. The bars $C_1$ and $C_2$ are also provided on their flanks $d_1$, $d_2$ and $d_3$, $d_4$ with pairs of central lateral electrodes 20b and 20'b and with pairs of terminal lateral electrodes 22b, 24b and 22'b, 24'b, which are all in substantial positional correspondence with the upper and lower electrodes. Thus the central portions of bars $C_1$ and $C_2$ are each provided with two pairs of facing electrodes, with an additional two pairs of facing electrodes being provided at each terminal portion of each bar. Typically, the length of bar 1 affected by a terminal electrode is slightly less than a quarter of the overall length L of a bar, the ratio between these two lengths being preferably 0.23.

To excite the resonator, a potential difference is applied between the electrodes off a voltage source not shown in FIG. 2, with the + identified electrodes being connected to one terminal of the source and the − identified electrodes being connected to the other terminal of the source, the electrodes of a facing pair being brought to the same potential. In particular the potential of the electrodes that are not visible in FIG. 2, i.e. on the bottom surfaces of the bars, is identical to that of the electrodes provided on the top surfaces and opposite thereto. Further, if both electrodes of one pair are brought to one potential, the two electrodes of the other pair in substantial positional correspondence therewith are brought to the opposite potential. Finally, if the upper and lower central electrodes are brought to one potential, the upper and lower terminal electrodes are brought to the opposite potential.

The interconnections needed for effectively bringing the various electrodes to the required potential have not been shown in FIG. 2. Because of the large number of electrodes involved, it is difficult to interconnect the various electrodes having to be brought to a particular potential by means of metallizations deposited directly on the pezioelectric material. It may therefore be of advantage only to energize some of the electrodes of the FIG. 2 resonator. For instance, only the central electrodes or only the terminal electrodes may be energized. In this case however the dynamic capacitance of the resonator as a whole is halved. Or the central electrodes and part of the terminal electrodes may be energized.

Figure 3:
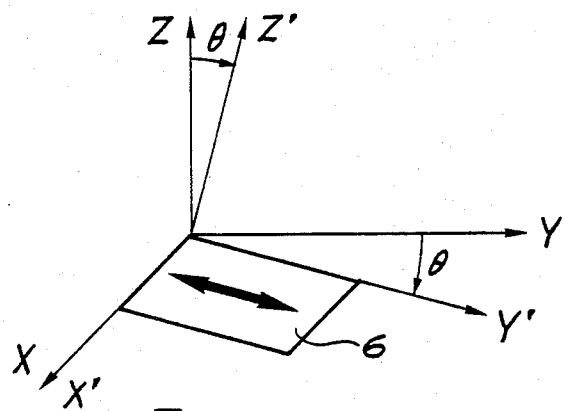
FIG. 3 is a perspective view showing the angle of cut $\theta$ for the resonator of FIGS. 1 and 2.

According to a particularly important feature of the sensitive element shown in FIGS. 1 and 2, the resonator 6 is cut along lines such that the coefficient of thermal expansion of the piezoelectric material from which it is made, in the direction in which the strain is applied, i.e. lengthwise of the bars $C_1$ and $C_2$, is identical or differs only very slightly from the coefficient of thermal expansion of the material forming the thin plate 4. FIG. 3 is a simplified representation of the resonator 6 indexed with reference to the X, Y and Z axes of quartz, the resonator being of course cut in this material. X', Y' and Z' are the axes of the resonator after cutting. From the manner of cutting in FIG. 3, the axes X', Y' and Z' follow from axes X, Y and Z through rotation by an angle $\theta$ about axis X. The coefficient of thermal expansion $\alpha'$ of quartz is different depending on whether the expansion is considered along the axis X or Y of the quartz or along its axis Z. In the first case the coefficient amounts to substantially 13.7 ppm/°C. (parts per million per degree Celsius) and in the second case it amounts to substantially 7.5 ppm/°C. The coefficient of thermal expansion $\alpha'$ of the resonator, depending on the direction in which the strain is applied, is thus given by the following relationship as a function of the angle of cut $\theta$;

$$\alpha' = 7.5 + (13.7 - 7.5) \cos^2\theta \, [\text{ppm}/°\text{C.}]$$

Thus by suitably choosing the angle of cut the coefficient $\alpha'$ may be given any value from 7.5 to 13.7 ppm/°C. There are many metals having a coefficient of thermal expansion within this range, e.g.:

"Normal steel" AISI 1020          $\alpha = 12,1$ ppm/°C.

| -continued | |
|---|---|
| Grey cast iron ASTM A48-48 | α = 12.1 ppm/°C. |
| Hastelloy C | α = 11.3 ppm/°C. |
| Inconel | α = 13.3 ppm/°C. |
| Nickel | α = 11.9 ppm/°C. |

Figure 4:
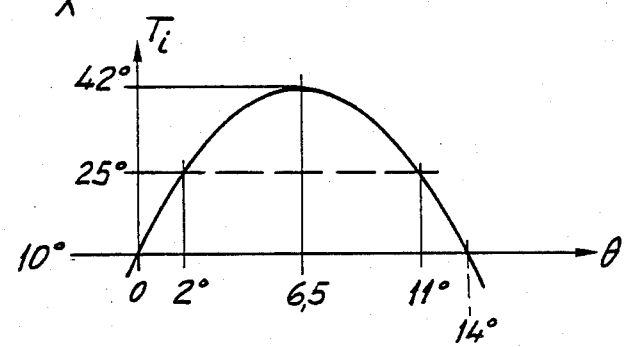
FIG. 4 is a graph showing the variations in the temperature of inversion for quartz as a function of the angle of cut $\theta$ shown in FIG. 3.

The angle of cut θ should however preferably be relatively small for two main reasons: firstly the cut then remains very close to Z thereby facilitating the etching action of the chemicals used to cut the quartz; secondly it is beneficial from a thermal point of view. As is well known, a characteristic of quartz resonators is that their frequency varies with temperature. In the case of a resonator operating in the flexion or elongation mode and having a Z type cut, such variation may be substantially parabolic. The apex of the parabola, commonly termed the point of inversion, corresponds to a so-called inversion temperature ($T_i$). FIG. 4 illustrates the variations of this inversion temperature as a function of angle θ. It will be observed that for angles θ between 0 and 14 degrees, the inversion temperature remains between 0 and 42 degrees Celsius. To decrease as much as possible the effect of temperature, the inversion temperature should lie in the temperature range of normal resonator use. Temperatures between 0 and 42 degrees satisfy this requirement. By way of example, with an angle of cut θ of 11 degrees the inversion temperature is 25 degrees and the coefficient of expansion α' is 13.47. Moreover, with a small angle θ a better excitation of the resonator can be achieved. For all of these reasons therefore, it is best for the coefficient α' to lie in a range bordering on the maximum of 13.7.

Instead of a rotation about axis X, rotation could also take place about axis Y. The relationship between the coefficient α' and the angle θ would remain the same. It would also be possible to have both a rotation about axis X and then about axis Y', the angle θ remaining the angle between axes Z and Z'. Here again the relationship between α' and θ would remain the same.

Figure 5:
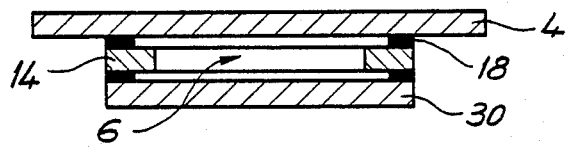
FIG. 5 is a vertical cross-section of a modification of the sensitive element shown in FIG. 1.

A tuning-fork is known to operate in a more stable way when it is in a relatively high vacuum chamber. Thus, if the sensitive element shown in FIG. 1 is mounted in a pressure sensor having an evacuated part and if the resonator is in this part, it is not necessary to modify the structure of the sensitive element in relation to that shown in FIG. 1. If on the other hand the resonator is in a region that is subject to atmospheric pressure or more generally to the pressure having to be measured, the sensitive element should be modified as shown in FIG. 5. According to this constructional form, the resonator 6 is enclosed in a fluidtight casing. The latter consists of the plate 4, of the frame 14 of the resonator which is secured to the plate by the layer of adhesive or solder 18, and of a cover 30 which is secured by adhesive or solder to the frame 14 along its periphery. The cover 30 is made from the same material as the plate 4 to avoid the problems caused by different coefficients of thermal expansion.

Figure 8:
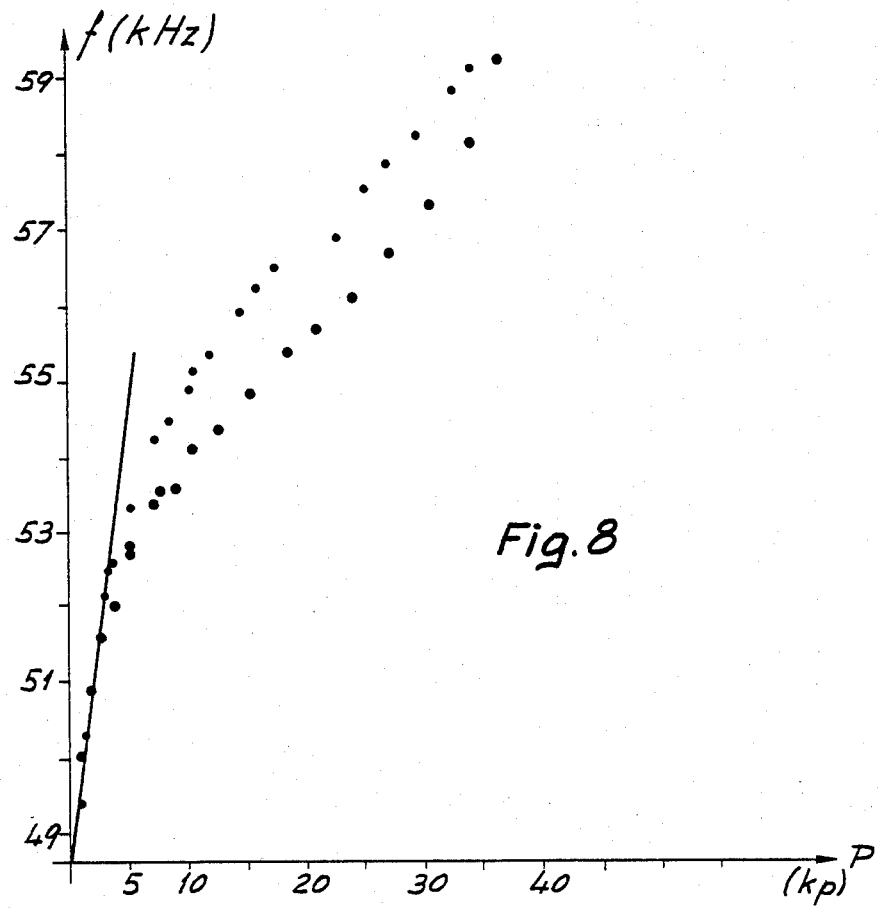
FIG. 8 is a graph showing frequency variation as a function of the strain applied to a sensitive element such as that shown in FIG. 1.

FIG. 8 shows the effects of a force on a sensitive element consisting of a resonator of the above described type secured by adhesive on a support consisting of an elongated plate of Inconel having a thickness of 300 μm, a length of 100 mm and a width of 5.0 mm. The FIG. 8 graph shows the variation of frequency f as a function of the force applied to the metal plate. As will be observed a good linearity is obtained between 0 and 4 kg (force). This provides a sensitivity of 1200 Hz per kg. Bearing in mind the dimensions of the metal plate 4 and of the resonator this amounts to a sensitivity of $2.5 \times 10^{-8}$/Hz for the ratio between the variation in relative length and the variation in frequency. Very good sensitivity is thus seen to be achieved. This manner of forming the support is well suited to a sensitive element for measuring a force. The end of the plate is anchored and the force to be measured is applied to the other end of the plate.

Figure 9:
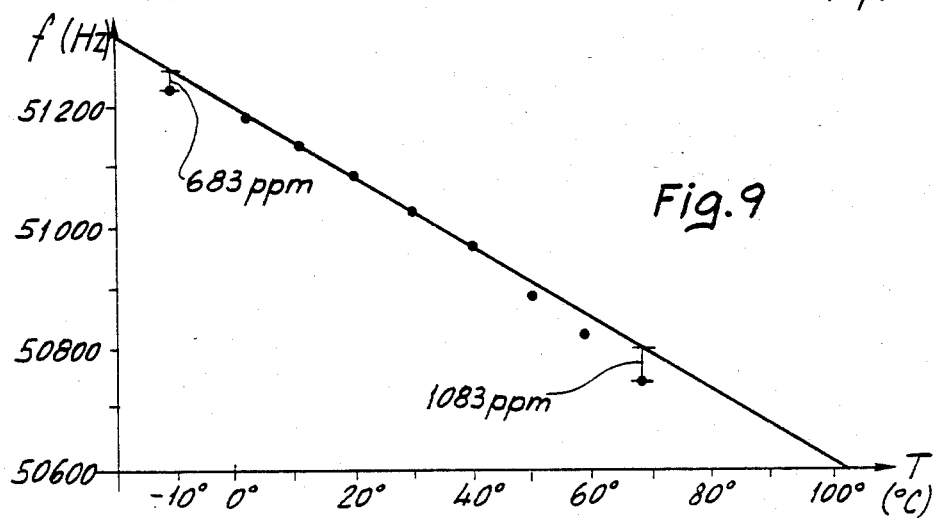
FIG. 9 is a graph showing the influence of temperature on frequency variations for a conventional sensitive element.

The graph of FIG. 9, which, for the same specimen, shows frequency (in Hz) as a function of temperature (in °C.), clearly illustrates the very adverse effects caused by the different coefficients of thermal expansion for the resonator and for the metal plate made of Inconel. Although there is relatively little difference in the coefficients of thermal expansion (13.3 and 13.7) it will be observed that the sensitivity to temperature is greater than 100 ppm/°C. in the regions where conditions are most favourable. By so constructing the resonator that the coefficients of thermal expansion of both the resonator and of the plate are the same, this temperature effect can be eliminated. This therefore eliminates the main fault usually encountered in pressure sensors. The variation in frequency of the resonator as such in dependence on temperature of course remains. However this temperature effect is only of the order of $35 \times 10^{-9}$/°C.$^2$. This detrimental temperature effect is therefore negligible if it is related to the sensitivity of the resonating element subjected to strain.

Figure 6:
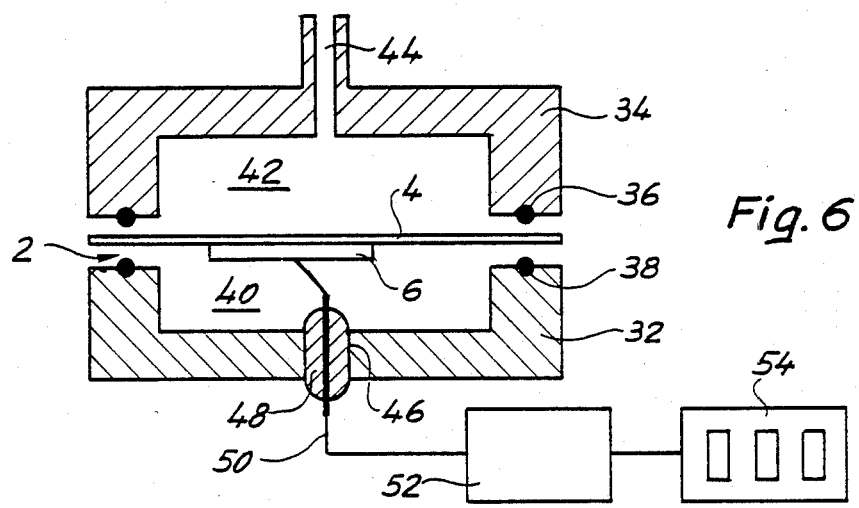
FIG. 6 is a partial view of a pressure sensor for measuring an absolute pressure and using a sensitive element according to the invention.

FIG. 6 shows in vertical cross-section the assembly of the sensitive element shown in FIG. 1 in a pressure sensor. The thin plate here is in the form of a disc having a diameter of for example 20 mm.

The pressure measuring sensor consists of a casing consisting of a bottom portion 32 and of a top portion 34. The periphery of the thin plate 4 of the sensitive element is secured in fluidtight manner between the two portions of the casing. Gaskets, for instance O-rings 36 and 38, may provide the required fluidtightness. The thin plate 4 divides the inside of the casing into a first chamber 40 in which a high vacuum is maintained and into a second chamber 42 which communicates via a conduct 44 with the enclosed space in which pressure is to be measured. The bottom portion 32 is formed with a through passage 46 into which is inserted an insulating and fluidtight packing 48 through which extends a set of conductors 50 connected to the electrodes for exciting the resonator 6. Outside the casing, the conductors 50 are connected to a processing and supply circuit 52 which controls means 54 for displaying the value of the pressure. In such a pressure sensor it is the free surface of plate 4 which is subjected to the pressure having to be measured, its other surface, that bearing the resonator 6, facing the vacuum chamber 40. The pressure in chamber 42 deforms the plate 4 thereby causing strains to be applied to the resonator 6. As explained earlier, by measuring the variations in the resonant frequency of the resonator caused by the pressure, it is possible to obtain in linear fashion the absolute pressure prevailing in chamber 42.

To perform a relative pressure measurement it suffices to subject chamber 40 to atmospheric pressure. The structure of the sensitive element must then be as shown in FIG. 5.

Figure 7:
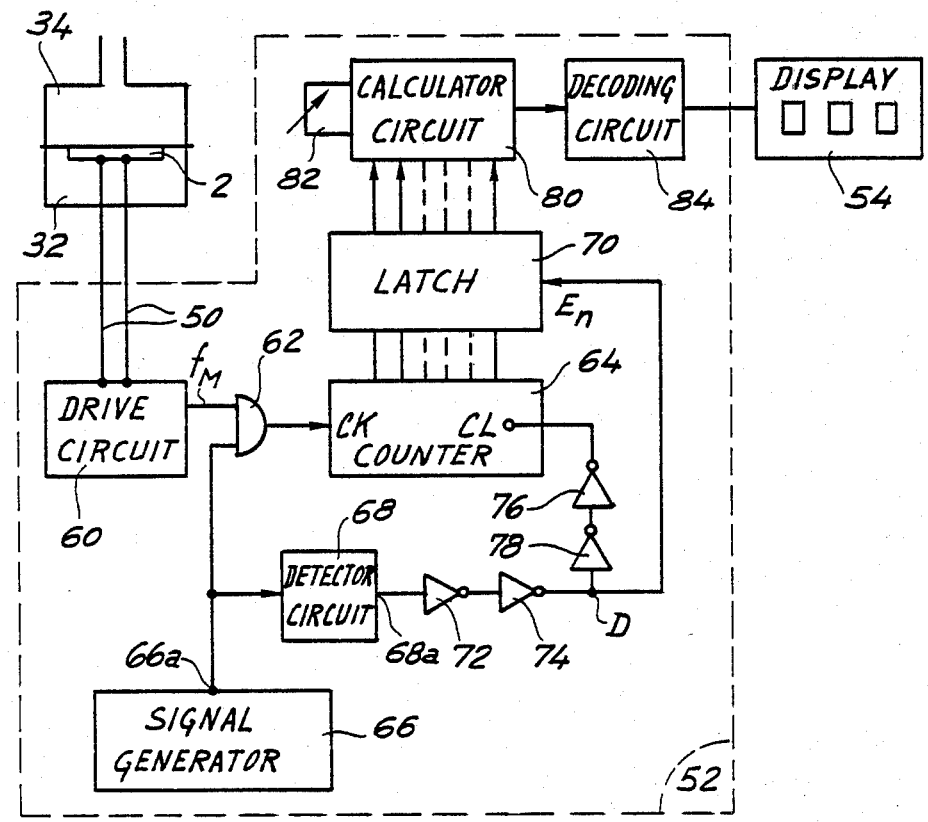
FIG. 7 is a diagram of the electronic circuit used to process the output signals of the resonator shown in FIG. 6 for displaying a pressure.

FIG. 7 shows a possible design for the circuit 52. The conductors 50 issuing from the casing 32,34 are connected to the input of a conventional drive circuit 60 which delivers at its output a signal having a frequency $f_M$ corresponding to the frequency at which the resonator vibrates in response to the pressure that prevails in the top portion 34 of the casing 32,34. The output of the drive circuit 60 is connected to one of the inputs of an AND gate 62 whose output is connected to the clock input CK of a counter 64. The circuit 52 also comprises a signal generator 66 which for example produces a signal having a duration of 100 milliseconds and a period of 1 second. The output 66a of generator 66 is connected firstly to the other input of gate 62 and secondly to the input of a detector circuit 68 which delivers at its output 68a a pulse each time it detects a falling edge in the signal it receives from the generator 66. The output signals of counter 64, which represent the states of the counter, are applied to the inputs of a latch 70 having an enable input $E_n$. The output 68a of the detector circuit 68 is connected to a point D via a pair of inverters 72 and 74 that serve to introduce a delay, e.g. of the order of 10 microseconds. Point D is connected firstly to a zero resetting input CL of the counter 64 via a pair of inverters 76 and 78, which also serve to introduce a delay, and secondly to the enable input $E_n$ of the latch 70. The output signals of the latch 70 are applied to the input of a calculator circuit 80 provided with means 82 for introducing parameters. The output signal of the calculator circuit 80 is fed into a decoding circuit 84 which in turn controls display means 54.

The operation of the circuit 52 will be clear from the preceeding description. The pulses of the signal having a frequency $f_M$ issuing from the drive circuit 60 increment the counter 64 during delivery of the periodic signal by the generator 66. At the end of each signal delivered by the generator 66, the detector circuit 68 delivers a pulse which is applied to the enable input $E_n$ of the latch 70. The contents of the counter 64 are thus transferred into the latch 70 whereupon the counter 64 is reset to zero via its input CL. The latch 70 thus contains in binary form a number that represents the number of pulses of signal $f_M$ during delivery of the signal from generator 60, i.e. for instance during 100 milliseconds. This number is processed by the calculator circuit 80 to deliver a number which is directly representative of pressure. The calculator circuit is simple since the relationship between the frequency $f_M$ and pressure is linear within the operating range of the device. The calculator circuit simply serves to subtract a given number corresponding to the calibration of the device and to divide the resulting number by a constant coefficient dependent on the accuracy with which the pressure is to be displayed. This kind of operation corresponds to the case where an absolute pressure is being measured. The value of the pressure is always positive. When relative pressure is being measured, the measured pressure may be positive or negative, i.e. the value df/f may be positive or negative. It is then necessary for the calculator circuit 80 to include means able to perform the necessary sign discrimination. It is then also necessary for these means to supply the decoding circuit 84 with information about the sign.

It will thus be apparent that a pressure sensor using a sensitive element according to the invention is structurally very simple since, in particular, it is not necessary to eliminate the effect of temperature.

The sensitive element may also serve to measure mechanical strains corresponding to the bending or deformation of loaded parts. In this context the sensitive element would replace what is generally known as a stress gauge. This means that the support, i.e. the thin plate, is secured by adhesive to one surface of the test-piece. To avoid the problem caused by differential thermal expansion the support must have the same coefficient of thermal expansion as the test-piece. The simplest solution is to make the support, i.e. the thin plate, from the same material as the test-piece. The materials given earlier by way of example show that the usual construction materials (steel, cast iron, etc.) are suitable.

In addition, the thickness of the support depends of course on the physical magnitude to be measured and on the value of this magnitude. The thickness of the plate forming the support may advantageously lie between 100 and 2000 microns.

Figure 10:
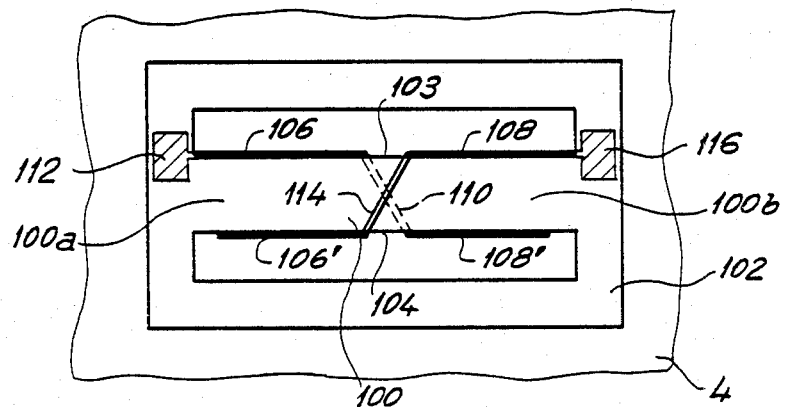
FIG. 10 is a plan view of a modified form of resonator for use in a sensitive element according to the invention.

Resonators other than that shown in FIG. 1 may be used in making the sensitive element. For instance FIG. 10 illustrates another resonator that would suit the sensitive element. It consists of a bar 100, made for example from quartz, which is fast at both its ends with a frame 102. The bar 100 and the frame 102 are here produced by etching a common quartz plate. The bar 100 is so excited that the half-bar 100a will work in compression and the half-bar 100b will work in extension, simultaneously. To this end the flanks 103 and 104 of bar 100 are provided with electrodes, with the half-bar 100a having electrodes 106 and 106' and the half-bar 100b having electrodes 108 and 108'. Electrodes 106 and 108' are connected to each other by a metallization 110 deposited on the bottom surface of the bar and are supplied off a terminal 112. Electrodes 106' and 108 are connected to each other by a metallization 114 deposited on the top surface of the bar and are connected to a terminal 116. The resonator is secured to the plate 4 and (as explained earlier) it is so cut that its coefficient of thermal expansion will be the same as that of the plate 4. The sensitive element shown in FIG. 10 may be provided with a cover, as was done in FIG. 5 for the sensitive element shown in FIG. 1. To this end the cover is fluidtightly secured by adhesive to the top surface of the frame 102, the bottom surface of the latter being secured by adhesive to the plate 4.

The plate 4 which is in contact with the medium whose pressure is to be measured must of course be made of a material which is compatible with this medium. In particular it should when necessary be able to withstand corrosion. It will always be possible to satisfy this condition by using for the thin plate 4 a quartz plate cut in the same way as the resonator.

What is claimed is:

1. A sensitive element for a strain sensor, comprising:
    a support having a coefficient of thermal expansion $\alpha$;
    an elongated piezoelectric resonator provided with electrodes; and
    means for securing the resonator to the support for transmitting to the resonator and lengthwise thereof strains applied to the support, the resonator having a cut such that its coefficient of thermal expansion longitudinally thereof is substantially equal to $\alpha$.

2. A sensitive element as in claim 1, wherein the resonator is of substantially oblong rectangular shape and is formed with a central, longitudinally extending, slot having a length less than that of the oblong rectangle to define a base at each end of the resonator, both bases being connected by two parallel bars separated by the slot, and wherein the electrodes are so arranged as to cause the resonator to vibrate according to a fundamental mode of flexion.

3. A sensitive element as in claim 2, wherein the securing means include a frame surrounding the resonator, said resonator being connected to said frame by its bases, said resonator and said frame being cut in a common plate of piezoelectric material, and said frame being secured to said support.

4. A sensitive element as in claim 3, further comprising a cover having substantially the same coefficient of thermal expansion as the resonator and which is secured by its periphery in fluidtight manner to the frame, and wherein the frame is secured in fluidtight manner to the support, the space enclosed by the cover, the frame and a part of the support and in which the resonator is housed being evacuated.

5. A sensitive element as in claim 1, wherein the resonator is in the form of a bar provided with electrodes capable of lengthening one half of the rod while at the same time shortening the other half, and wherein the securing means include a frame secured to the support, the ends of the bar being rigid with the frame and said bar and said frame being cut in a common plate of piezoelectric material.

6. A sensitive element as in claim 1, wherein the resonator is a quartz and the coefficient of thermal expansion $\alpha$ of the support ranges from 7.5 to 13.7 parts per million per degree Celsius.

7. A sensitive element as in claim 6, wherein the main surfaces of the resonator are at right angles to an axis Z' that forms an angle $\theta$ with the Z-axis of the quartz, the angle $\theta$ being defined by the relationship $\cos^2\theta = (\alpha - 7.5)/(13.7 - 7.5)$ in which $\alpha$ is expressed in parts per million per degree Celsius.

8. A sensitive element as in claim 7, wherein the coefficient $\alpha$ lies between 13 and 13.7 parts per million per degree Celsius.

9. A pressure sensor comprising:
a casing;
a sensitive element as in claim 1 in which the support is a thin plate which is secured in fluidtight manner to the casing so as to divide the casing into first and second chambers;
means for applying the pressure to be measured in the first chamber; and
means for applying voltages to the electrodes of the sensitive element and for receiving an electric signal having a frequency which is dependent on said pressure.

10. A pressure sensor as in claim 9, wherein the second chamber is evacuated.

* * * * *